(12) United States Patent
Inohara

(10) Patent No.: US 6,384,659 B2
(45) Date of Patent: May 7, 2002

(54) INTEGRATED CIRCUIT

(75) Inventor: Hiroki Inohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/851,316

(22) Filed: May 9, 2001

(30) Foreign Application Priority Data

May 10, 2000 (JP) ..................................... 2000-136543

(51) Int. Cl.[7] .............................................. G06F 1/04
(52) U.S. Cl. ..................... 327/295; 327/293; 327/565
(58) Field of Search ............................ 327/293, 295, 327/564, 565

(56) References Cited

U.S. PATENT DOCUMENTS

| | | | | |
|---|---|---|---|---|
| 5,239,215 A | * | 8/1993 | Yamaguchi | 326/101 |
| 5,896,055 A | * | 4/1999 | Toyonaga et al. | 326/93 |
| 5,923,188 A | * | 7/1999 | Kametani et al. | 326/101 |
| 6,111,448 A | * | 8/2000 | Shibayama | 327/291 |
| 6,326,812 B1 | * | 12/2001 | Jefferson | 326/93 |

FOREIGN PATENT DOCUMENTS

| | | |
|---|---|---|
| JP | 5-159080 | 6/1993 |
| JP | 8-55962 | 2/1996 |
| JP | 8-190443 | 7/1996 |
| JP | 9-130370 | 5/1997 |
| JP | 11-328244 | 11/1999 |
| JP | 2000-35832 | 2/2000 |

* cited by examiner

*Primary Examiner*—Kenneth B. Wells
*Assistant Examiner*—Cassandra Cox
(74) *Attorney, Agent, or Firm*—McGinn & Gibb, PLLC

(57) ABSTRACT

An IC (Integrated Circuit) including internal circuitry to which a multiphase clock is distributed includes 1/n clock, main wiring drivers each including a frequency divider for dividing the frequency of an input clock by n and a drive circuit for delivering the resulting 1/n clock to a corresponding 1/n clock main wiring. Normal clock, main wiring drivers each include a delay for delaying an input clock to thereby output a normal clock and a drive circuit for delivering the normal clock to a corresponding normal clock main wiring. A clock distributing circuit includes clock wirings for distributing a clock input via a clock input circuit and a plurality of repeat buffers for distributing the distributed clock to each of the 1/n clock and normal clock, main wiring drivers. The IC additionally includes a wiring wiring the outputs of the repeat buffers, a wiring wiring the outputs of 1/n clock, main wiring drivers, and wiring wiring the outputs of the normal clock, main wiring drivers.

15 Claims, 3 Drawing Sheets

INTEGRATED CIRCUIT

BACKGROUND OF THE INVENTION

The present invention relates to an IC (Integrated Circuit) and more particularly to a clock distribution system for distributing a multiphase clock to the internal circuitry of an IC.

Today, a clock frequency required of a LSI (Large Scale Integrated circuit) is entering a gigahertz band and must be implemented by a multiphase clock. In this respect, it is necessary to reduce not only a clock skew in each phase but also a clock skew between different phases. To feed clocks of different frequencies to the internal logical circuit of a LSI, a plurality of different clock distribution paths are indispensable. As for a clock skew between different phases, assume that a multiphase clock has a frequency produced by dividing the frequency of a reference clock or normal clock by an integer. Then, a clock skew between different phases refers to a skew between the positive-going or the negative going of the divided clock (1/n) and the reference clock from which the above edge is produced.

Assume that a plurality of clock distribution paths sharing a single clock input point are laid on a LSI by extending a conventional scheme. Then, as for a clock skew between different phases, a clock distribution delay and the influence of scatter in production and noise increase. While design margins may be increased in order to stabilize the operation of the LSI, increased margins limit the performance of the LSI. Particularly, when clocks lying in the gigahertz band are distributed to a LSI, fine buffering is essential in order to cope with the skin effect of wirings, reflection and other physical characteristics, tending to aggravate the clock distribution delay. This is one of major causes that obstruct skew reduction. Further, scatter in the production of LSIs, which has not been discussed in the past, is a problem in further scaling up LSIs.

The easiness of design is a prerequisite for reducing a TAT (Turn-Around Time) in the development of LSIs. To reduce a TAT, Japanese Patent Laid-Open Publication No. 8-55962, for example, discloses a system in which a clock source (buffer) and its output are wired in order to allow delays to be matched (skew reduction) at the design stage and to reduce the influence of scatter in production. Japanese Patent Application No. 10-205361 teaches a configuration in which a clock distribution system using clock wirings easily reduces a clock skew.

However, none of the prior art schemes even suggests a measure against skew reduction in relation to the distribution of a multiphase clock. Therefore, there is an increasing demand for multiphase clock distribution realizing skew reduction without resorting to any noticeable modification of the conventional clock distribution arrangement.

Technologies relating to the present invention are also disclosed in, e.g., Japanese Patent Laid-Open Publication Nos. 5-159080, 8-190443, 9-130370, and 11-328244.

SUMMARY OF THE INVENTION

It is therefore an object of the present invention to provide an IC capable of reducing a clock skew when a multiphase clock is distributed to its internal circuitry.

In accordance with the present invention, an IC including internal circuitry to which a multiphase clock is distributed includes 1/n clock, main wiring drivers each including a frequency divider for dividing the frequency of an input clock by n and a drive circuit for delivering the resulting 1/n clock to a corresponding 1/n clock main wiring. Normal clock, main wiring drivers each include a delay for delaying an input clock to thereby output a normal clock and a drive circuit for delivering the normal clock to a corresponding normal clock main wiring. A clock distributing circuit includes clock wirings for distributing a clock input via a clock input circuit and a plurality of repeat buffers for distributing the distributed clock to each of the 1/n clock and normal clock, main wiring drivers. The IC additionally includes a wiring wiring the outputs of the repeat buffers, a wiring wiring the outputs of 1/n clock, main wiring drivers, and wiring wiring the outputs of the normal clock, main wiring drivers.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
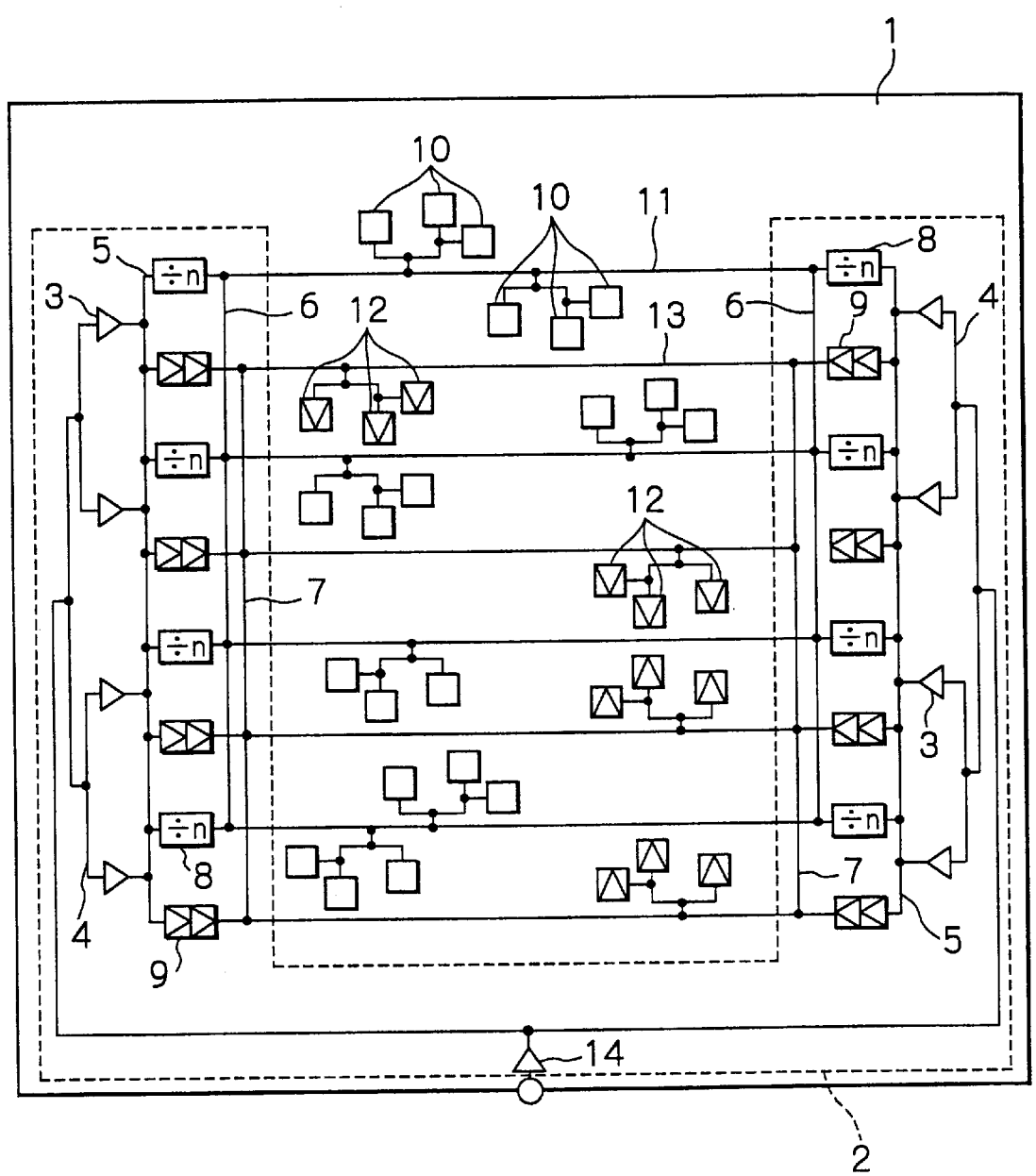
FIG. 1 is a schematic block diagram showing the layout of an IC embodying the present invention.

Referring to FIG. 1 of the drawings, a semiconductor IC embodying the present invention is shown and generally designated by the reference numeral 1. As shown, the semiconductor IC, to which a multiphase clock is distributed, includes sequential circuits or internal circuitry 10 and 12 and a clock distributing circuit 2 for distributing the clock to the sequential circuits 10 and 12.

The clock distributing circuit 2 includes a plurality of 1/n clock, main wiring drivers 8 and a plurality of normal clock, main wiring drivers 9. The 1/n clock, main wiring drivers 8 each divide the frequency of a reference clock or normal clock by n and feeds the resulting 1/n clock to a particular 1/n clock, main wiring 11 associated therewith. The normal clock, main wiring drivers 9 each delay the reference clock and delivers the resulting delayed clock to a particular normal clock, main wiring 13 associated therewith.

A clock wiring 4 and a plurality of repeat buffers 3 are assigned to each of the 1/n clock, main wiring drivers 8 and normal clock, main wiring drivers 9 for distributing a clock input via a clock input circuit 14. A repeat buffer output wiring 5 wires the outputs of all of the repeat buffers 3. A wiring 6 wires the outputs of all of the 1/n clock, main wiring drivers 8. Further, a wiring 7 wires the outputs of all of the normal clock, main wiring drivers 9.

Each 1/n clock, main wiring 11 is driven by the output of the associated 1/n clock, main wiring driver 8. Likewise, each normal clock, main wiring 13 is driven by the associated normal clock, main wiring driver 9. The sequential circuits 10, which are driven by the 1/n clock, each are connected to a particular 1/n clock, main wiring 11. The sequential circuits 12, which are driven by the normal clock, each are connected to a particular normal clock, main wiring 13.

Figure 2:
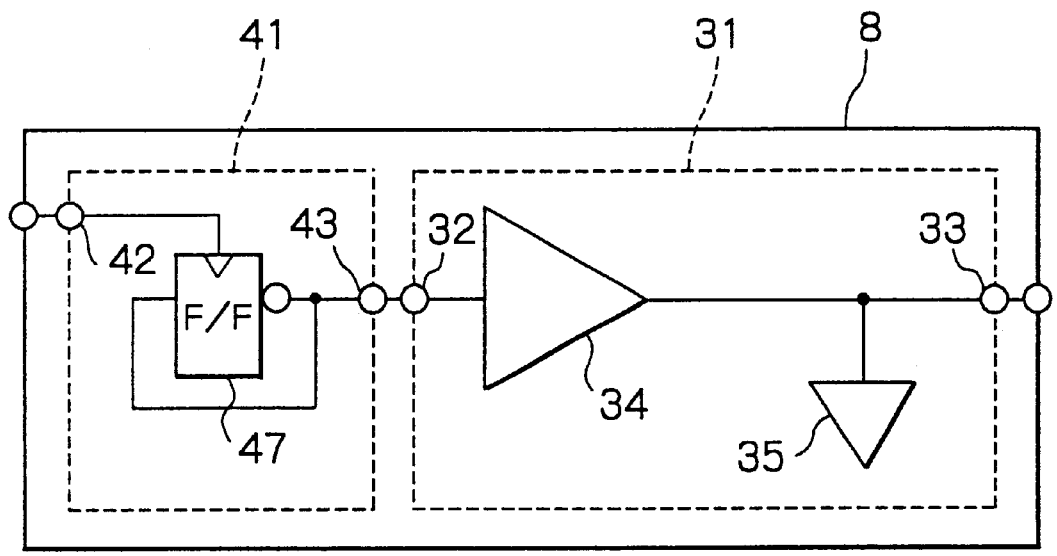
FIG. 2 is a schematic block diagram showing a specific configuration of a 1/n clock, main wiring driver included in the illustrative embodiment.

FIG. 2 shows a specific configuration of one of the 1/n clock, main wiring drivers 8. This main wiring driver 8 is assumed to divide an input clock by 2. As shown, the main wiring driver 8 is generally made up of a ½ frequency divider 41 and a ½ clock, main wiring drive circuit 31. The ½ frequency divider 41 includes a F/F (Flip-Flop) 44 for dividing a normal clock input via a normal clock input 42. The resulting ½ clock output from the F/F 44 is fed to an input 32 included in the ½ clock, main wiring drive circuit 31. The ½ clock input to the main wiring drive circuit 31 is delivered to an output 33, which is also included in the main wiring drive circuit 31, via a drive buffer 34. The main wiring drive circuit 31 additionally includes a load circuit 35 for adjusting a load on the main wiring drive circuit 31.

Figure 3:
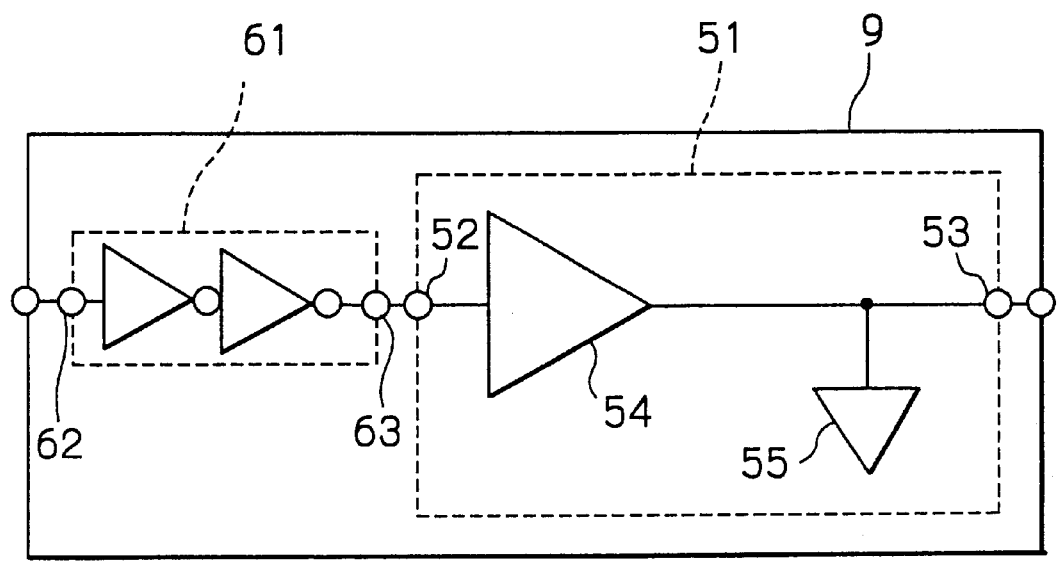
FIG. 3 is a schematic block diagram showing a specific configuration of a normal clock, main wiring driver also included in the illustrative embodiment.

FIG. 3 shows a specific configuration of one of the normal clock, main wiring drivers 9. As shown, the main wiring driver 9 is made up of a delay 61 for delaying the normal clock and a normal clock, main wiring drive circuit 51. The delay 61 includes a serial connection of buffers for delaying the normal clock input via an input 62. A delayed clock appearing on the output 63 of the delay 61 is applied to the input 52 of the normal clock, main wiring drive circuit 51. The delayed clock input to the main wiring drive circuit 51 is delivered to the output of the circuit 51 via a drive buffer 54. The main wiring drive circuit 51 additionally includes a load circuit 55 for adjusting a load on the main wiring drive circuit 51.

In the semiconductor IC 1, only the reference clock or normal clock included in the multiphase clock input via the clock input circuit 14 is distributed to the 1/n clock, main wiring drivers 8 and normal clock, main wiring drivers 9 via the clock wirings 4, repeat buffers 3, and repeat buffer output wiring 5. At this instant, the repeat buffers 3 and wirings 4 and 5 each are provided with an identical configuration and an identical characteristic in order to implement an identical wiring length and an identical load, i.e., an identical distribution delay. In addition, the repeat buffer output wiring 5 is so configured as to reduce variation in distribution delay within the LSI ascribable to scatter in production. It follows that the clock can be distributed to the 1/n clock, main wiring drivers 8 and normal clock, main wiring drivers 9 with a minimum of clock skew.

Figure 4:
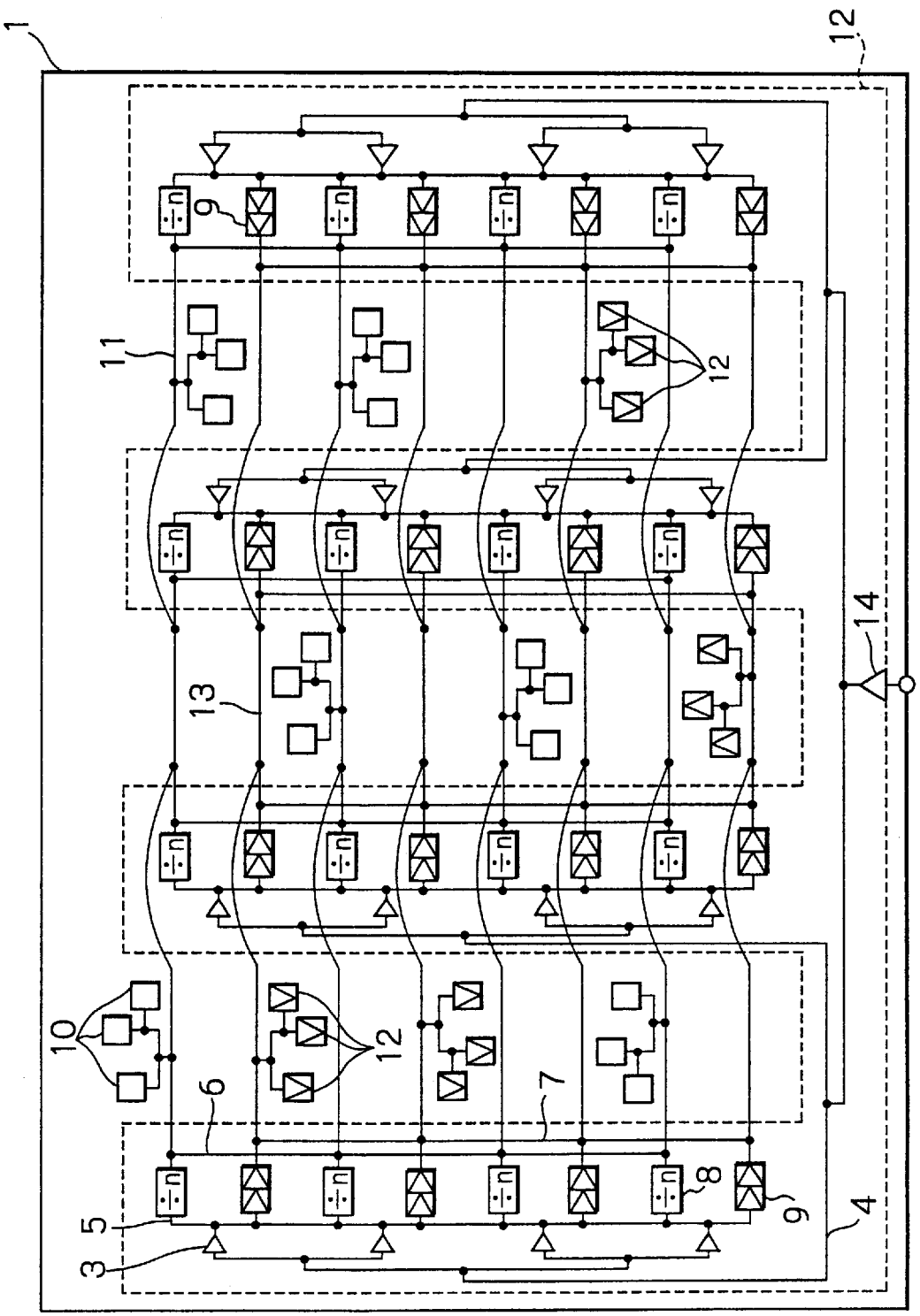
FIG. 4 is a schematic block diagram showing a layout representative of an alternative embodiment of the present invention.

In the illustrative embodiment, the 1/n clock, main wiring drivers 8 and normal clock, main wiring drivers 9 and repeat buffers 3 are arranged around the internal circuitry of the LSI, as shown in FIG. 1. Alternatively, as shown in FIG. 4, a plurality of blocks 2 each including the main wiring drivers 8 and 9 and repeat buffers 3 may be arranged in a comb-like pattern. In any case, the clock distributing section shown and described occupies major part of the distribution delay from the input point to terminal points, e.g., FF/RAM. In FIG. 4, circuit elements identical with the circuit elements shown in FIG. 1 are designated by identical reference numerals and will not be described in order to avoid redundancy.

The 1/n (½ in FIG. 2) frequency divider 41 and 1/n clock, main wiring drive circuit 31, which constitute each 1/n clock main wiring driver 8, produce the required 1/n clock and drive the associated main wiring or trunks 11 and loads. Although the frequency of the normal clock does not have to be divided, the 1/n frequency divider 41 brings about a delay. Therefore, should the normal clock, main wiring drive circuit 51, FIG. 3, be used to drive the associated main wiring 13 and loads, the delay ascribable to the 1/n frequency divider 41 would directly translate into a clock skew. In the illustrative embodiment, the delay 61, FIG. 3, produces a delay equal to the delay ascribable to the path between the input 42 and the output 43 of the 1/n frequency divider 41, thereby obviating the above clock skew.

In the illustrative embodiment, the main wiring or trunk structures respectively driven by the 1/n clock, main wiring drivers 8 and normal clock, main wiring drivers 9 are identical. In addition, the wiring 6 wiring the main wiring drivers 8 and the wiring 7 wiring the main wiring drivers 9 successfully reduce a clock skew particular to each phase as effectively as conventional main wiring drive circuitry.

As for a clock skew between different phases, the 1/n clock and normal clock both are derived from the wiring 5. However, major part of the delay is the distribution delay between the wiring 5 and the 1/n clock and normal clock, main wiring drivers 8 and 9. This, coupled with the fact that the main wiring driver 9 is identical with the main wiring driver 8 except for the delay 61, successfully reduces the clock skew between different phases.

The 1/n clock and normal clock distribution paths of the illustrative embodiment can be configured without noticeably modifying a conventional trunk distribution system. The illustrative embodiment therefore makes the most of the easiness of design available with the drunk distribution system and needs a minimum of modification of a conventional design scheme.

Even if the 1/n clock and normal clock drive trunks and FF/RAMs or similar loads are not balanced, the load circuits 35 and 55 shown in FIGS. 2 and 3, respectively, adjust the loads, thereby further enhancing clock skew reduction.

In the specific configuration shown in FIG. 4, an array of 1/n clock, main wiring drivers 8 and an array of normal clock, main wiring drivers 9 may be alternately arranged at both sides of an IC. Such a configuration implements a symmetric layout and therefore facilitates layout design.

In summary, it will be seen that the present invention provides an IC having various unprecedented advantages, as enumerated below.

(1) Assume that a multiphase clock having a frequency produced by dividing the frequency of a reference clock by an integer is to be distributed to an LSI. Then, only the reference clock is first distributed from a clock input to a main clock distributing circuit, which is arranged over substantially the entire LSI. Subsequently, a multiphase clock produced by buffers is distributed via trunks each being assigned to a particular phase. This successfully reduces a clock distribution delay and therefore a clock skew after the branching of the clock.

(2) The clock distribution of the present invention is practicable without noticeably modifying the conventional trunk distribution system. The present invention therefore makes the most of the easiness of design particular to the trunk distribution system and requires a minimum of change in design procedure. Further, the main clock distributing circuit includes load adjusting circuits for correcting the unbalance of loads on the trunks, e.g., the total load of F/Fs, RAMs or similar sequential circuits connected to the trunks. This further reduces a clock skew.

What is claimed is:

1. An IC (Integrated Circuit) including internal circuitry to which a multiphase clock is distributed, said IC comprises:

a plurality of 1/n clock, main wiring drivers each including frequency dividing means for dividing a frequency of an input clock by n (n being a positive integer) to thereby output a 1/n clock and drive means for delivering said 1/n clock to a corresponding 1/n clock main wiring;

a plurality of normal clock, main wiring drivers each including delay means for delaying an input clock to thereby output a normal clock and drive means for delivering said normal clock to a corresponding normal clock main wiring;

a clock distributing circuit including lock wirings for distributing a clock input via a clock input circuit and a plurality of repeat buffers for distributing said clock distributed to each of said plurality of 1/n clock, main wiring drivers and said plurality of normal clock, main wiring drivers;

a wiring wiring outputs of all of said plurality of repeat buffers;

a wiring wiring outputs of all of said plurality of 1/n clock, main wiring drivers; and a wiring wiring outputs of all of said plurality of normal clock, main wiring drivers.

2. The IC as claimed in claim 1, wherein said clock wirings of said clock distributing circuit have an identical length while said repeat buffers have an identical characteristic, so that the normal clock distributed from said clock distributing circuit to said 1/n clock, main wiring drivers and said normal clock, mainwiring drivers has a same delay.

3. The IC as claimed in claim 2, wherein said frequency dividing means and said delay means have an identical delay time.

4. The IC as claimed in claim 3, wherein said 1/n clock, said drive means included in each of said main wiring drivers and said normal clock, main wiring drivers comprises load adjusting means.

5. The IC as claimed in claim 4, wherein said 1/n clock, main wiring drivers, said normal clock, main wiring drivers and said repeat buffers are arranged around the internal circuitry.

6. The IC as claimed in claim 4, wherein a plurality of clock distributing circuits each including said 1/n clock, main wiring drivers and said normal clock, main wiring drivers are arranged in a comb-like pattern.

7. The IC as claimed in claim 1, wherein said frequency dividing means and said delay means have an identical delay time.

8. The IC as claimed in claim 7, wherein said 1/n clock, said drive means included in each of said main wiring drivers and said normal clock, main wiring drivers comprises load adjusting means.

9. The IC as claimed in claim 8, wherein said 1/n clock, main wiring drivers, said normal clock, main wiring drivers and said repeat buffers are arranged around the internal circuitry.

10. The IC as claimed in claim 8, wherein a plurality of clock distributing circuits each including said 1/n clock, main wiring drivers and said normal clock, main wiring drivers are arranged in a comb-like pattern.

11. The IC as claimed in claim 1, wherein said 1/n clock, said drive means included in each of said main wiring drivers and said normal clock, main wiring drivers comprises load adjusting means.

12. The IC as claimed in claim 11, wherein said 1/n clock, main wiring drivers, said normal clock, main wiring drivers and said repeat buffers are arranged around the internal circuitry.

13. The IC as claimed in claim 11, wherein a plurality of clock distributing circuits each including said 1/n clock, main wiring drivers and said normal clock, main wiring drivers are arranged in a comb-like pattern.

14. The IC as claimed in claim 1, wherein said 1/n clock, main wiring drivers, said normal clock, main wiring drivers and said repeat buffers are arranged around the internal circuitry.

15. The IC as claimed in claim 1, wherein a plurality of clock distributing circuits each including said 1/n clock, main wiring drivers and said normal clock, main wiring drivers are arranged in a comb-like pattern.

* * * * *